United States Patent [19]

Ortiz

[11] 4,034,895

[45] July 12, 1977

[54] DEVICE FOR KEEPING BREAD FRESH

[76] Inventor: Enid Ortiz, 1928 Gerritt St., Philadelphia, Pa. 19146

[21] Appl. No.: 624,376

[22] Filed: Oct. 21, 1975

[51] Int. Cl.[2] .......................................... B65G 59/00
[52] U.S. Cl. ............................... 221/277; 221/289
[58] Field of Search .......... 221/277, 231, 232, 194, 221/195

[56] References Cited

U.S. PATENT DOCUMENTS

| | | | |
|---|---|---|---|
| 1,022,680 | 4/1912 | Johnson | 221/231 |
| 2,080,277 | 5/1937 | Kade | 221/232 X |
| 2,919,051 | 12/1959 | Wideburg et al. | 221/195 X |
| 3,578,207 | 5/1971 | Danow | 221/232 |

Primary Examiner—Allen N. Knowles
Attorney, Agent, or Firm—Joel Halpern

[57] ABSTRACT

A bread storage and dispensing device consisting essentially of a housing which is provided with front and rear doors and a bread ejecting mechanism. The housing contains an inclined bread supporting surface in the interior, and the ejector mechanism includes a rotatable shaft which, upon rotation, ejects a slice of bread positioned closest to the front door and automatically positions itself between the next two slices of bread so that upon rotation of the shaft another slice of bread is ejected from the device. The bread supporting surface within the housing is inclined at an acute angle relative to the horizontal so that the slices of bread are stored in substantially upright position.

4 Claims, 5 Drawing Figures

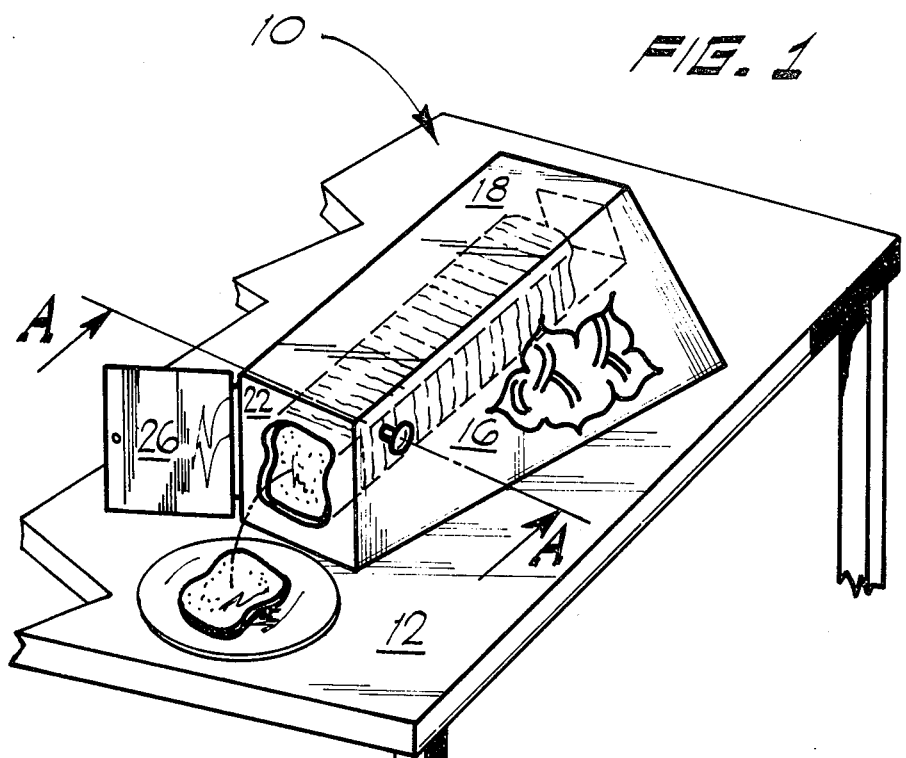
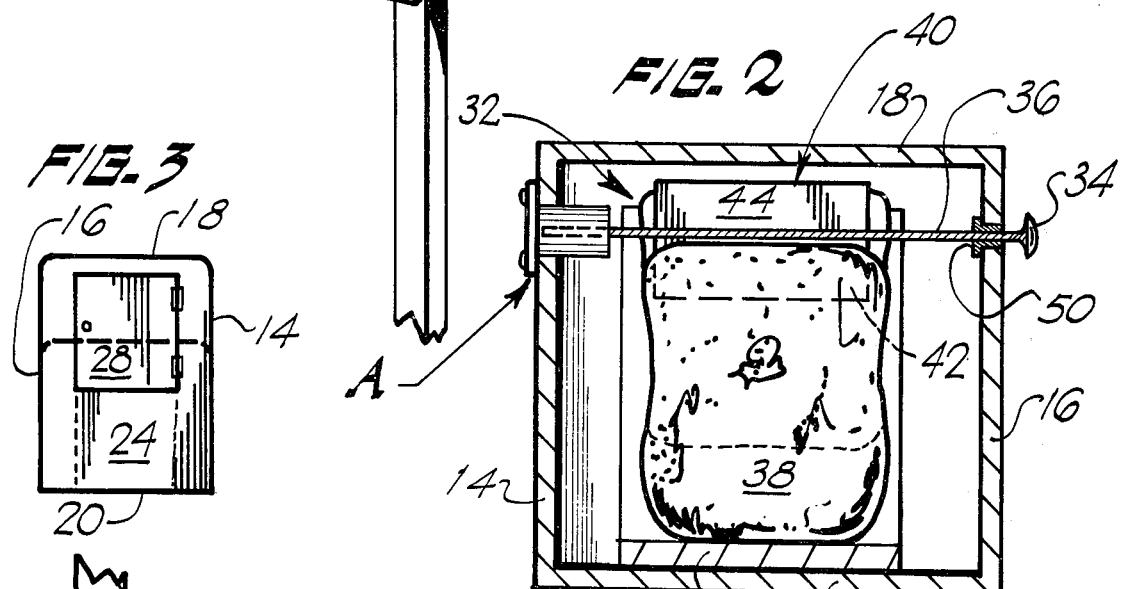
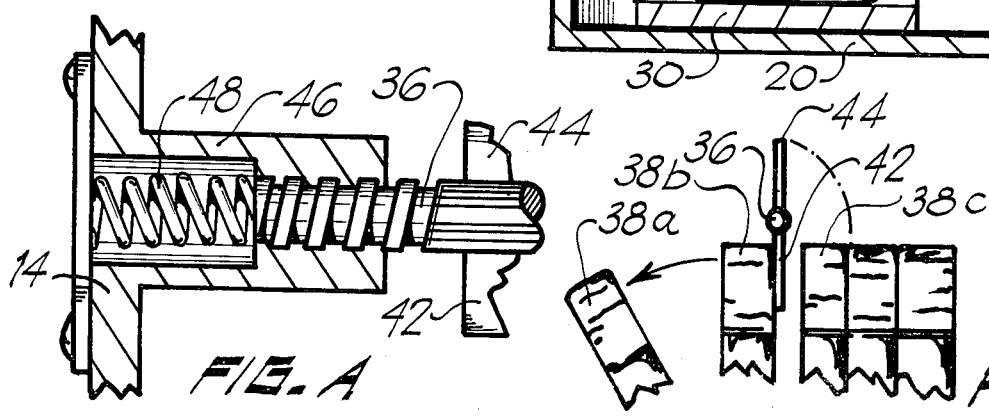

DEVICE FOR KEEPING BREAD FRESH

BACKGROUND OF THE INVENTION

The present invention relates to a bread storage and dispensing device, and more particularly to a device of this character where one slice of bread is dispensed each time the ejector is actuated.

Bread storage and dispensing devices have been known heretofore Typical of such prior devices are the dispensers disclosed in U.S. Pat. No. 2,812,990 issued Nov. 12, 1957 to E. F. Smith and in U.S. Pat. No. 2,819,819 issued Jan. 14, 1958 to G. B. Warren. In both of such devices a housing is provided in which a stack of bread slices is stored in substantially horizontal disposition. The patent to Warren further discloses means at the bottom of the housing for insuring that single slices of the bread may be serially removed from the housing. However, it will be appreciated that when slices of bread are stored in a stack there is a tendency for the slices in the lower regions of the stack to become compressed. When removed from the dispensing device in such a compressed state the slices are less appetizing in appearance. Further, if the slices are stored for any length of time the air will be forced out of such slices and the bread, upon removal from the device, is frequently hard and crusty. In addition, since the prior devices stored in bread in a stacked relationship the gravitational force exerted by the stacked slices upon the ejecting mechanism often resulted in malfunctions in such mechanism, possibly because of fatigue in the springs of such mechanisms. There has also been difficulty experienced with prior devices of this type with respect to jamming due to the premature dropping of slices of bread during the ejection of a lower slice.

SUMMARY OF THE INVENTION

It is one object of the invention to provide a bread storage and dispensing device in which the slices of bread retain their original uncompressed form even when stored for a prolonged period of time.

Another object of the invention is the provision of a bread storage and dispensing device having a bread ejecting mechanism which serially ejects slices of bread and is reliable and relatively free of malfunctions.

Still another object of the invention is the provision of a bread storage and dispensing device which is capable of serially ejecting slices of bread without risk of jamming by succeeding slices of bread.

Other objects and advantages of the invention will become readily apparent to persons versed in the art from the following description of the invention.

In accordance with the present invention there is provided a bread storage and dispensing device comprising an elongated housing dimensioned to store a plurality of slices of bread therein, support means interior of said housing for supporting said slices of bread on a surface which is inclined at an acute angle relative to the horizontal, closure means at the front and rear end portions of said housing, and means for serially ejecting said slices of bread through the front of said housing.

BRIEF DESCRIPTION OF THE DRAWINGS

In order that the invention may be more fully understood it will now be described, by way of example, with reference to the accompanying drawings in which:

FIG. 1 is a perspective view of the bread storage and dispensing device resting on a supporting surface;

FIG. 2 is a cross-sectional view of the device shown in FIG. 1 taken along line A—A thereof;

FIG. 3 is a rear elevational view of the device shown in FIG. 1;

FIG. 4 is a schematic illustration of the manner by which slices of bread are serially dispensed by the ejector mechanism; and FIG. A is an inset illustrating in larger scale and in greater detail a side wall of the device and the portion of the ejector mechanism supported therein.

DETAILED DESCRIPTION OF THE INVENTION

Referring to the drawings there is shown a bread storage and dispensing device indicated generally by reference numeral 10. The device is depicted as being supported upon a table top 12. The device is constructed with side walls 14 and 16 and top and bottom walls 18, 20. Front end wall 22 and rear end wall 24 complete an enclosing housing. Closure means 26 and 28 are provided respectively in the front and rear end walls. As shown in FIGS. 1 and 3 such closure means preferably take the form of doors which are pivotally mounted on the respective end walls. The housing is dimensioned so as to store therewithin a plurality of slices of bread.

Positioned within the housing and being either an integral part of the bottom wall 20 thereof or as a separate element positionable thereon is an inclined support surface 30 for the slices of bread. The support surface is disposed so as to form an acute angle with the horizontal. In this manner the slices of bread are stored within the housing upon the support surface 30 in a substantially upright position with the centers of gravity of succeeding slices of bread located in ascending order. This disposition of the bread slices results in a slight gravitational force with tends to urge the slices towards the front of the housing and the ejector mechanism to be hereinafter described.

As shown more clearly in FIG. 2, an ejector mechanism 32 is positioned adjacent the front end wall of the housing and is manually operable by means of actuator button 34. The double headed arrow is intended to depict a preferred arrangement for the ejector mechanism whereby movement of the actuator in one direction enables rotation of shaft 36 in a clockwise direction as viewed from the right side (actuator side) of the device. Shaft 36 is journalled in the opposed side walls of the housing for rotation whenever a slide of bread is to be ejected. The shaft is positioned so as to be at a height above the top of the bread slices 38. An ejector element 40 is fixedly secured to the shaft so as to be rotatable therewith. The ejector element preferably is formed with plate-like radial extensions or portions 42, 44 which project from opposed diametral locations of the shaft. The dimensions of such extensions or portions are selected such that when the shaft is rotated the lower portion serves to eject a slice of bread whereas the upper portion rotates to a position behind the next slice of bread where it is ready, upon actuation of the release mechanism, to eject that slice.

It will be seen, from FIG. 2, that one end of shaft 36 is supported within a bracket 46 which may be integral with the side wall or secured thereto in any convenient manner. As shown spring means 48 is provided which bears against the end of shaft 36 to urge the shaft, by virtue of a collar 50 formed at the other end of the shaft, into frictional engagement with the side wall 16 of the housing. Such frictional restraint serves to maintain the shaft and the ejector element thereon in a stationary position in readiness for actuation to release the next slice of bread. The bracket 46, spring 48, shaft 36 and the ejector element thereon may be constructed as an assembly for insertion into and removal from the housing as a single unit. It will be appreciated that by pushing actuator 34 the shaft is urged against the force of spring 48 and is freed of frictional restraint so as to permit rotation of the shaft to eject a slice of bread and simultaneously position one of ejector portions 42, 44 behind the next slice of bread for ejection thereof upon the next actuation of control member 34. It will be further appreciated that a torsion spring may desirably be employed which is so calibrated as to automatically rotate shaft 36 and the ejector element to eject a slice of bread and position the other portion of the ejector element upon actuation of control member 34.

FIG. 4 depicts the ejection of a slice of bread 38a and the positioning of ejector porition 42 between slices 38b and 38c. As shown by the phantom lines, in the form of an arc, ejector element portion 44 will, upon the next actuation of the control member 34, pivot so as to be positioned behind slice 38c.

From the foregoing it will be seen that a bread storage and dispensing device has been provided which enables the attainment of the above stated objectives and avoids the disadvantages of the prior devices.

What is claimed is:

1. A bread storage and dispensing device comprising: an elongated housing dimensioned to store a plurality of slices of bread therein; support means interior of said housing for supporting said slices of bread in a substantially upright position and in a substantially uncompressed state on a surface which is inclined at an acute angle relative to the horizontal; closure means at the front and rear end portions of said housing; a shaft rotatably journaled in opposed side walls of said housing at a height above the top of the bread slices within said housing; an ejector element fixedly secured to said shaft to be rotatable therewith and including portions extending radially beyond opposed diametral locations of said shaft, the radial dimensions of said ejector portions being selected such that rotation of said shaft causes a first of said portions to urge the slice of bread adjacent said front closure from the housing and the second ejector portion to pivot and be positioned between the next two succeeding slices of bread.

2. A bread storage and dispensing device according to claim 1, wherein said front and rear closure means comprise front and rear doors pivotally mounted on front and rear walls of said housing.

3. A bread storage and dispensing device according to claim 1, wherein said first and second ejector portions comprise plate-like elements, spring means being mounted in one of the side walls of said housing to frictionally restrain said shaft from rotation, manually operable control means being provided for releasing said shaft from said frictional restraint for rotation of said shaft and said ejector means.

4. A bread storage and dispensing device according to claim 3, wherein said spring means comprises a torsion spring connected with said shaft so as to effectuate rotation of same and said ejector means upon the manipulation of said control means and the release of said shaft from frictional restraint.

* * * * *